(12) United States Patent
Koller et al.

(10) Patent No.: US 12,212,253 B2
(45) Date of Patent: Jan. 28, 2025

(54) CONTROLLER AND DRIVE CIRCUITS FOR ELECTRIC MOTORS

(71) Applicant: Regal Beloit America, Inc., Beloit, WI (US)

(72) Inventors: Michael R. Koller, Columbia City, IN (US); Ludovic Andre Chretien, Columbia City, IN (US)

(73) Assignee: Regal Beloit America, Inc., Milwaukee, WI (US)

( * ) Notice: Subject to any disclaimer, the term of this patent is extended or adjusted under 35 U.S.C. 154(b) by 212 days.

(21) Appl. No.: 18/069,182

(22) Filed: Dec. 20, 2022

(65) Prior Publication Data

US 2024/0204698 A1    Jun. 20, 2024

(51) Int. Cl.
*H02P 1/44*    (2006.01)
*H02K 11/25*   (2016.01)
*H02K 11/26*   (2016.01)
*H02K 11/33*   (2016.01)
*H02P 27/06*   (2006.01)

(52) U.S. Cl.
CPC .............. *H02P 1/44* (2013.01); *H02K 11/25* (2016.01); *H02K 11/26* (2016.01); *H02K 11/33* (2016.01); *H02P 27/06* (2013.01); *H02K 2213/03* (2013.01)

(58) Field of Classification Search
CPC ........... H02P 1/44; H02P 27/06; H02K 11/25; H02K 11/26; H02K 11/33; H02K 2213/03
USPC ......................................................... 318/778
See application file for complete search history.

(56) References Cited

U.S. PATENT DOCUMENTS

| | | | |
|---|---|---|---|
| 4,398,097 | A | 8/1983 | Schell et al. |
| 4,566,289 | A | 1/1986 | Iizuka et al. |
| 4,787,211 | A | 11/1988 | Shaw |
| 4,876,859 | A | 10/1989 | Kitamoto |
| 4,947,655 | A | 8/1990 | Shaw |
| 4,988,930 | A | 1/1991 | Oberheide |
| 4,992,721 | A | 2/1991 | Atos |
| 5,023,469 | A | 6/1991 | Bassett et al. |
| 5,218,283 | A | 6/1993 | Wills et al. |
| 5,570,585 | A | 11/1996 | Vaynberg |

(Continued)

FOREIGN PATENT DOCUMENTS

| | | |
|---|---|---|
| GB | 2054295 A | 2/1981 |
| JP | 2005180748 A | 7/2005 |
| KR | 20060098080 A | 9/2009 |

*Primary Examiner* — Jorge L Carrasquillo
(74) *Attorney, Agent, or Firm* — Armstrong Teasdale LLP

(57) ABSTRACT

An electric motor system is provided. The electric motor system includes a drive circuit including an inverter configured to supply variable frequency current over a first duration and a switch configured to supply line frequency current over a second duration. The electric motor system further includes an electric motor coupled to the drive circuit and a controller communicatively coupled to the drive circuit. The controller is configured to control the inverter to supply variable frequency current to the electric motor over the first duration, determine to control the drive circuit to transition from supplying variable frequency current to supplying line frequency current, measure at least one parameter of the inverter, compute, based on the at least one measured parameter, an adjustment to a default parameter to enable the inverter to reach a threshold output frequency, and operate the inverter based on the computed adjustment to the default parameter.

17 Claims, 4 Drawing Sheets

(56) References Cited

U.S. PATENT DOCUMENTS

| | | | |
|---|---|---|---|
| 5,780,990 A * | 7/1998 | Weber | H02P 27/02 |
| | | | 318/438 |
| 5,828,200 A | 10/1998 | Ligman et al. | |
| 5,915,070 A | 6/1999 | Takekawa et al. | |
| 6,051,952 A | 4/2000 | Moreira et al. | |
| 6,121,749 A | 9/2000 | Wills et al. | |
| 6,163,129 A | 12/2000 | Younger et al. | |
| 6,246,207 B1 | 6/2001 | VanSistine et al. | |
| 6,508,072 B1 | 1/2003 | Kanazawa et al. | |
| 6,801,013 B2 | 10/2004 | Woodward et al. | |
| 6,876,103 B2 | 4/2005 | Radusewicz et al. | |
| 6,952,088 B2 | 10/2005 | Woodward et al. | |
| 7,272,302 B2 | 9/2007 | Woodward et al. | |
| 7,336,003 B2 | 2/2008 | Lathrop et al. | |
| RE40,161 E | 3/2008 | Panuce | |
| 7,760,497 B2 | 7/2010 | Eddy et al. | |
| 8,174,853 B2 | 5/2012 | Kane et al. | |
| 8,766,489 B2 | 7/2014 | Lathrop | |
| 8,853,992 B2 | 10/2014 | Boom | |
| 8,981,705 B2 | 3/2015 | Ramu | |
| 9,631,852 B2 | 4/2017 | Kopko | |
| 9,803,803 B1 | 10/2017 | Adam et al. | |
| 10,203,141 B1 | 2/2019 | Chretien et al. | |
| 10,819,254 B2 | 10/2020 | Chretien et al. | |
| 11,855,563 B2 * | 12/2023 | Morales | H02P 25/188 |
| 2002/0038554 A1 | 4/2002 | Monk et al. | |
| 2002/0110461 A1 | 8/2002 | Iwanami et al. | |
| 2002/0134094 A1 | 9/2002 | Huh et al. | |
| 2003/0051494 A1 | 3/2003 | Ohya | |
| 2003/0169013 A1 | 9/2003 | Kadah | |
| 2003/0206804 A1 | 11/2003 | Smith | |
| 2004/0093893 A1 | 5/2004 | Tanimoto et al. | |
| 2004/0159115 A1 | 8/2004 | Matsunaga et al. | |
| 2004/0163613 A1 | 8/2004 | Bystedt et al. | |
| 2006/0032255 A1 | 2/2006 | Hwang et al. | |
| 2006/0061321 A1 | 3/2006 | Han et al. | |
| 2006/0097687 A1 | 5/2006 | Byrnes, Jr. et al. | |
| 2008/0188173 A1 | 8/2008 | Chen et al. | |
| 2008/0209925 A1 | 9/2008 | Pham | |
| 2008/0290824 A1 * | 11/2008 | Choi | H02J 3/007 |
| | | | 318/770 |
| 2008/0314057 A1 | 12/2008 | Lifson et al. | |
| 2009/0030554 A1 | 1/2009 | Bean, Jr. et al. | |
| 2009/0179498 A1 | 7/2009 | Lathrop et al. | |
| 2009/0196764 A1 | 8/2009 | Fogarty et al. | |
| 2009/0218962 A1 | 9/2009 | Kubal et al. | |
| 2010/0058781 A1 | 3/2010 | Lifson et al. | |
| 2010/0064703 A1 | 3/2010 | Senf, Jr. et al. | |
| 2010/0085000 A1 | 4/2010 | Todd et al. | |
| 2010/0307191 A1 | 12/2010 | Sommer | |
| 2011/0144811 A1 | 6/2011 | Liu | |
| 2011/0234134 A1 | 9/2011 | Ramu | |
| 2012/0090337 A1 | 4/2012 | Chen et al. | |
| 2014/0180483 A1 | 6/2014 | Cheng et al. | |
| 2016/0254763 A1 | 9/2016 | Hong et al. | |
| 2017/0077857 A1 | 3/2017 | Chretien et al. | |
| 2018/0269810 A1 * | 9/2018 | Chretien | H02P 1/445 |
| 2019/0170404 A1 | 6/2019 | Chretien et al. | |

\* cited by examiner

CONTROLLER AND DRIVE CIRCUITS FOR ELECTRIC MOTORS

BACKGROUND

The field of the disclosure relates generally to electric motors, and specifically to a motor controller controlling a drive circuit to transition from using an inverter to supplying line frequency power.

At least some known electric motors are fixed speed motors that may operate most efficiently at line frequency power. Such motors exhibit uncontrolled acceleration during startup. Further, at low load conditions, such motors operate less efficiently. Alternatively, some induction motors, such as permanent-split capacitor (PSC) motors, may be driven with a variable speed motor controller to adapt motor speed to a load level. Such configurations are generally limited by power factor, electromagnetic interference, and electrical losses.

A drive circuit for certain motors enables efficient operation at both high and low load conditions. For example, a motor operating a compressor in a heating, ventilation and air conditioning (HVAC) system may experience high load conditions during peak temperatures and low load conditions during milder temperatures. The drive circuit operates the motor using an inverter under low load conditions, and operates the motor using line frequency power under high load conditions.

Transitioning from using an inverter to supplying line frequency power presents significant challenges. For example, if a sufficient torque is not maintained during the transition, the motor may stall or experience a significant loss of speed. Further, factors such as input voltage and temperature may affect an ability of the inverter to maintain a motor transition speed and/or output voltage adequate for supplying enough torque to properly transition to supplying line frequency power.

BRIEF DESCRIPTION

In one aspect, an electric motor system is provided. The electric motor system includes a drive circuit including an inverter configured to supply variable frequency current over a first duration and a switch configured to supply line frequency current over a second duration. The electric motor system further includes an electric motor coupled to the drive circuit. The electric motor system further includes a controller communicatively coupled to the drive circuit. The controller is configured to control the inverter to supply variable frequency current to the electric motor over the first duration. The controller is further configured to determine to control the drive circuit to transition from supplying variable frequency current to supplying line frequency current. The controller is further configured to measure at least one parameter of the inverter. The controller is further configured to compute, based on the at least one measured parameter, an adjustment to a default parameter to enable the inverter to reach a threshold output frequency for transitioning to supplying the electric motor with line frequency current. The controller is further configured to operate the inverter based on the computed adjustment to the default parameter.

In another aspect, a method for controlling a drive circuit for an electric motor is provided. The method includes controlling an inverter of the drive circuit to supply variable frequency current to the electric motor over a first duration. The method further includes determining to control the drive circuit to transition from supplying variable frequency current to supplying line frequency current to the electric motor. The method further includes measuring at least one parameter of the inverter. The method further includes computing, based on the at least one measured parameter, an adjustment to a default parameter to enable the inverter to reach a threshold output frequency for transitioning to supplying the electric motor with line frequency current. The method further includes operating the inverter based on the computed adjustment to the default parameter.

In another aspect, a motor controller is provided. The motor controller includes a processor communicatively coupled to a drive circuit of an electric motor. The processor is configured to control an inverter of the drive circuit to supply variable frequency current to the electric motor over a first duration. The processor is further configured to determine to control the drive circuit to transition from supplying variable frequency current to supplying line frequency current to the electric motor. The processor is further configured to measure at least one parameter of the inverter. The processor is further configured to compute, based on the at least one measured parameter, an adjustment to a default parameter to enable the inverter to reach a threshold output frequency for transitioning to supplying the electric motor with line frequency current. The processor is further configured to operate the inverter based on the computed adjustment to the default parameter.

DETAILED DESCRIPTION

Figure 1:
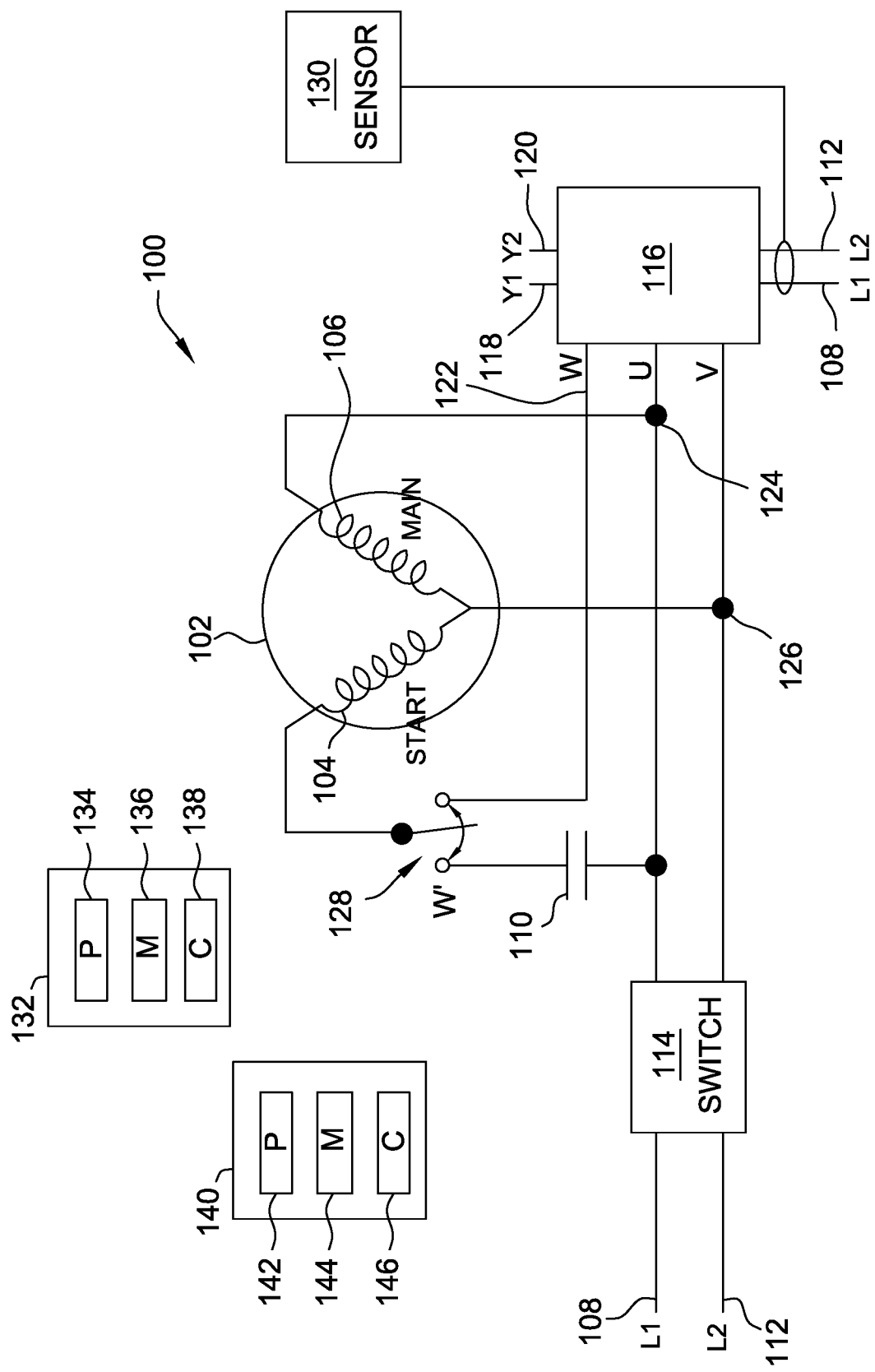
FIG. 1 is a schematic diagram of an example drive circuit for an electric motor.

In operating an electric motor (e.g., and a mechanical compressor driven by the electric motor), a drive circuit for the electric motor drives the electric motor with an inverter under low load conditions and with line frequency power under high load conditions.

Generally, the electric motor must maintain an output torque greater than a load torque required to move the load. Maintaining sufficient torque during a transition from supplying current from the inverter to supplying line frequency requires that the inverter output frequency and motor speed, be sufficiently high before the transition. However, factors such as input voltage or temperature may affect an ability of the inverter to output a current at a sufficient frequency. Accordingly, the drive circuit described herein is in communication with at least one controller (e.g., a motor controller, a system controller, etc.) configured to measure these factors to determine, before the transition to supplying line power, whether the inverter is able to provide current at a frequency (sometimes referred to herein as a "threshold output frequency") sufficient for the drive circuit to transition to supplying line power without stalling the electric motor.

In the example embodiment, the controller is configured to control the inverter to supply variable frequency current to the electric motor over a first duration. The inverter may be controlled based on certain parameters (e.g., a voltage to frequency constant or maximum allowed phase current, as described in further detail below), referred to herein as "default parameters," that define certain limits for operating the electric motor to ensure the motor is operated safely (e.g., so the electric motor does not overheat). While variable frequency current is supplied by the inverter, the controller may determine to control the drive circuit to transition from supplying variable frequency current to supplying line frequency current (e.g., in response to a load or speed demand being above a certain threshold).

Before controlling the drive circuit to supply line frequency current, the controller is configured measure at least one parameter of the inverter, such as an input voltage or other parameters (e.g., a temperature or current) of the inverter, that may indicate whether the inverter is currently capable of operating at a frequency sufficient for a transition to supplying line power. Based on the measured parameter (e.g., if the input voltage is below a predefined threshold), the controller is configured to adjust the default parameter to enable the electric motor to reach a threshold output frequency for transitioning to supplying line frequency current. The adjustment may be temporary to avoid conditions that could potentially damage the electric motor (e.g., excessive current and/or overheating). If, once the default parameter is adjusted, the inverter and/or electric motor reaches a frequency sufficient for transitioning to line power, the controller is configured to proceed to control the drive circuit to supply line current to the electric motor once the threshold output frequency has been attained by the inverter.

FIG. 1 is a schematic diagram of an example electric motor system 100 including a PSC motor 102 and a drive circuit for supplying current to PSC motor 102. PSC motor 102 includes a start winding 104 and a main winding 106. During normal line frequency operation, line frequency current, such as 50 Hertz or 60 Hertz, for example, is supplied on a first line, or L1, 108 to start winding 104 through a capacitor 110, and to main winding 106. A second line, or L2, 112 provides a return, or neutral, for the line frequency current. Electric motor system 100 includes a switch 114 for connecting and disconnecting L1 and L2 to PSC motor 102. Switch 114 may include one or more contactors such as a two pole mechanical contactor that is commutated by energizing a coil (not shown), one or more solid state switches, or any combination thereof. In certain embodiments, capacitor 110 may be coupled to L1 on either side of switch 114.

Electric motor system 100 includes an inverter 116 enabled to drive PSC motor 102 with variable frequency power under low load, or at least less than full load, conditions. In some embodiments, inverter 116 is supplied line frequency power on L1 and L2, and is controlled over control lines 118 and 120, or Y1 and Y2. In some embodiments, inverter 116 may be controlled by any other suitable means, including, for example, digital control signals (e.g., serial communication or Modbus communication) and analog control signals (e.g., transmitted from motor controller 132 or system controller 140). Inverter 116 enables variable speed operation of PSC motor 102 by regulating phase and frequency of alternating current (AC) voltages on output terminals W, U, and V. Terminal W is coupled to a node 122, terminal U is coupled to a node 124, and terminal V is coupled to a node 126. Electric motor system 100 includes a bypass switch 128 that enables bypass of capacitor 110 during operation through inverter 116. When driven by inverter 116, start winding 104 of PSC motor 102 is coupled across nodes 122 and 126, i.e., terminals W and V of inverter 116, and main winding 106 is coupled across nodes 124 and 126, i.e., terminals U and V of inverter 116.

When operating PSC motor 102 using inverter 116, switch 114 is open and inverter 116 is enabled via control lines 118 and 120, or other suitable control means. To transition to line frequency power, inverter 116 is disabled and switch 114 is closed to couple L1 and L2 directly to PSC motor 102.

Electric motor system 100 further includes at least one sensor 130 configured to detect or measure properties of L1 108 and/or L2 112 at a power input of inverter 116 such as, for example, a voltage, current, frequency, phase, or another parameter. Sensor 130 is communicatively coupled with motor controller 132 and/or system controller 140. For example, motor controller 132 and/or system controller 140 may be configured to interpret a voltage or current signal generated by sensor 130 to determine values measured by sensor 130. In some embodiments, electric motor system 100 includes additional sensors (e.g., temperature sensors) for measuring properties of inverter 116 or other components of electric motor system 100.

Motor controller 132 is communicatively coupled to PSC motor 102 to operate PSC motor 102. Further, motor controller 132 may be coupled to one or more additional components of electric motor system 100, including inverter 116, switch 114, switch 128, and control lines 118 and 120 (Y1 and Y2). More specifically, motor controller 132 transmits control signals to operate PSC motor 102. In the example embodiment, by adjusting the control signals, motor controller 132 is configured to control inverter 116 to supply variable frequency current to PSC motor 102 as described above. Further, motor controller 132 is configured to adjust the control signals to control the transition from inverter 116 supplying variable frequency power, to supplying line frequency power as described above (e.g., from L1 and L2). For example, in some embodiments, motor controller 132 and inverter 116 are embodied in the same drive (e.g., such that motor controller 132 receives signals from control lines 118 and 120, and then commands inverter 116 based upon the received signals). In some embodiments, motor controller 132 may be communicatively coupled to another controller (e.g., system controller 140) associated with PSC motor 102. In such embodiments, motor controller 132 may be configured to allow system controller 140 to operate PSC motor 102. In the example embodiment, motor controller 132 is separate from PSC motor 102. In one example, motor controller 132 and inverter 116 may be integrated with PSC motor 102. In another example, motor controller 132 and/or system controller 140 is an external controller, such as a thermostat system controller. In some embodiments, motor controller 132 and system controller 140 may be integrated in the same controller (e.g., any description of motor controller 132 may be integrated in system controller 140, or any other controller, and vice versa).

In an example embodiment, motor controller 132 includes processor 134, memory 136 communicatively coupled to processor 134, and communications interface 138. Motor controller 132 is also communicatively coupled with system controller 140. Processor 134 is configured to execute instructions stored within memory 136 to cause motor controller 132 to function as described herein. Moreover, memory 136 is configured to store data to facilitate controlling PSC motor 102. In some embodiments, motor controller 132 may include a plurality of processors 134 and/or memories 136. In other embodiments, memory 136 may be integrated with processor 134. In one example, memory 136 includes a plurality of data storage devices to store instructions and data as described herein. Communications interface 138 may include one or more wired or wireless hardware interface such as, for example, universal serial bus (USB), RS232, RS485, or other serial bus, CAN bus, Ethernet, near field communication (NFC), WiFi, Bluetooth, or any other suitable digital or analog interface for establishing one or more communication channels. The established communication channels may include, for example, channels between motor controller 132 and system controller 140. Communications interface 138 further includes a software or firmware interface for receiving one or more motor control parameters and writing them, for example, to memory 136. In some embodiments, communication interface 138 includes, for example, a software application programming interface (API) or command set for controlling, as an example, a contactor to close when transitioning from using an inverter to supplying line frequency power.

In the example embodiment, system controller 140 includes processor 142, memory 144 communicatively coupled to processor 142, and communications interface 146. System controller 140 is also communicatively coupled with motor controller 132. Processor 142 is configured to execute instructions stored within memory 144 to cause system controller 140 to function as described herein. In some embodiments, system controller 140 may include a plurality of processors 134 and/or memories 136. In other embodiments, memory 144 may be integrated with processor 142. In one example, memory 144 includes a plurality of data storage devices to store instructions and data as described herein. Communications interface 146 may include one or more wired or wireless hardware interface such as, for example, universal serial bus (USB), RS232 or other serial bus, CAN bus, Ethernet, near field communication (NFC), WiFi, Bluetooth, or any other suitable digital or analog interface for establishing one or more communication channels. The established communication channels may include, for example, channels between system controller 140 and motor controller 132. Communications interface 146 further includes a software or firmware interface for receiving one or more motor control parameters and writing them, for example, to memory 144. As explained above, in some embodiments, system controller 140 may be configured to perform any of the functions described herein with respect to motor controller 132 or any other controller.

To transition properly from supplying start winding 104 and main winding 106 with current from inverter 116 to supplying start winding 104 and main winding 106 with line current, an output torque of motor PSC motor 102 greater than a load torque must be maintained. Maintaining this necessary torque requires inverter 116 to maintain an output current having a sufficient frequency. For example, certain PSC motors 102 require the output frequency to be at least about 40 hertz in order to transition to 60 hertz line frequency without the output torque of PSC motor 102 falling below the load torque. A capability for inverter 116 to provide this minimum frequency depends, in turn, on factors such as input voltage, temperature, and default parameters under which inverter 116 is controlled such as, for example, a voltage to frequency constant and/or a maximum allowed phase current.

Accordingly, to ensure a transition to supplying line power can occur without failure, motor controller 132 (and/or system controller 140) is configured to measure (e.g., using sensor 130) an input voltage, and/or other parameters (e.g., temperature), of inverter 116, prior to making the transition to supplying line power. In some embodiments, such parameters may be measured indirectly or inferred. For example, an voltage can be inferred from a DC bus voltage or from the motor current at a given frequency. Based on the measured input voltage and/or other measured parameters, motor controller 132 is configured to determine whether it is necessary to adjust the default parameters in order for inverter 116 to reach an output frequency sufficient to enable a transition to supplying PSC motor 102 with line power. As described above, the output frequency may depend on factors such as the current input voltage and/or temperature, and further depends on the default parameters, which may be adjusted to enable the inverter to reach the threshold output frequency.

For example, motor controller may temporarily adjust the voltage to frequency constant and/or increase the maximum phase current allowed in start winding 104 and/or main winding 106, which may allow inverter 116 to meet the threshold output frequency under the current input voltage and temperature. The voltage to frequency constant is a predefined ratio between the output voltage (i.e., the voltage applied to PSC motor 102 by inverter 116) and output frequency of inverter 116. Because decreasing this ratio (e.g., by increasing frequency without increasing voltage) generates higher currents in PSC motor 102 under load, leading to increased heating and losses, this ratio is generally kept constant or to an optimal value by motor controller 132. However, this ratio can be decreased temporarily, in order to attain an adequate frequency for transitioning to supplying line power. Similarly, increasing the maximum phase current allowed in start winding 104 and/or main winding 106 allows inverter 116 to attain a higher frequency for a given input voltage, while resulting in increased heating in PSC motor 102. In some embodiments, the voltage to frequency constant and/or maximum allowed phase current are adjusted by a fixed or predefined increment. Alternatively, in some embodiments, motor controller 132 is configured to determine an increment for adjusting the voltage to frequency constant and/or maximum allowed phase current based on a difference between a maximum output frequency currently attainable and the threshold output frequency. For example, this difference may be used as an input to a formula or lookup table to determine the increment by which to adjust the voltage to frequency constant and/or maximum allowed phase current. The formula may be, for example, a linear or polynomial regression that approximates a mathematical relationship between the input frequency, default parameters, and maximum output frequency determined based on experimental data. In some such embodiments, this computation may be performed repeatedly to dynamically update the default parameter. To prevent damage to PSC motor 102 (e.g., due to excessive heat), such adjustments to the default parameters (e.g., voltage to frequency constant and/or maximum allowed phase current) may be time-limited.

In response to adjusting the default parameters, motor controller 132 may determine whether the threshold output frequency has been attained. If the minimum threshold output frequency has not been or cannot be reached even with adjustments to the default parameters, motor controller 132 is configured to prevent the transition to supplying line power. Otherwise, PSC motor 102 may not maintain sufficient output torque during the transition and may stall or otherwise fail to transition to receiving line power. If motor controller 132 determines that the threshold output frequency has been reached or is attainable, motor controller 132 is configured to, once the threshold output frequency has been attained by inverter 116, disable inverter 116 and close switch 114 to supply line current directly to PSC motor 102.

In some embodiments, motor controller 132 is configured to compute a maximum output frequency based on the measured parameters (e.g., the measured input frequency and/or other measured parameters) and on other known parameters (e.g., one or more of the default parameters). If the computed maximum output frequency does not meet the threshold output frequency, PSC motor 102 may fail during the transition to supplying line power. Accordingly, in such embodiments, in response to the maximum output frequency being less than the threshold output frequency, motor controller 132 is configured to adjust at least one parameter (e.g., the default parameters described above) to increase the maximum frequency if the computed maximum output frequency is less than the threshold output frequency.

Although PSC motor 102 is illustrated as a PSC motor, it should be appreciated that similar systems and methods may be applied to other types of motors, such as another type of induction motor or a permanent magnet motor, such as an electronically commutated motor (ECM). Moreover, PSC motor 102 may drive a compressor, or may drive any other fluid-moving apparatus, such as a fan, blower, impeller, pump, and the like.

Figure 2:
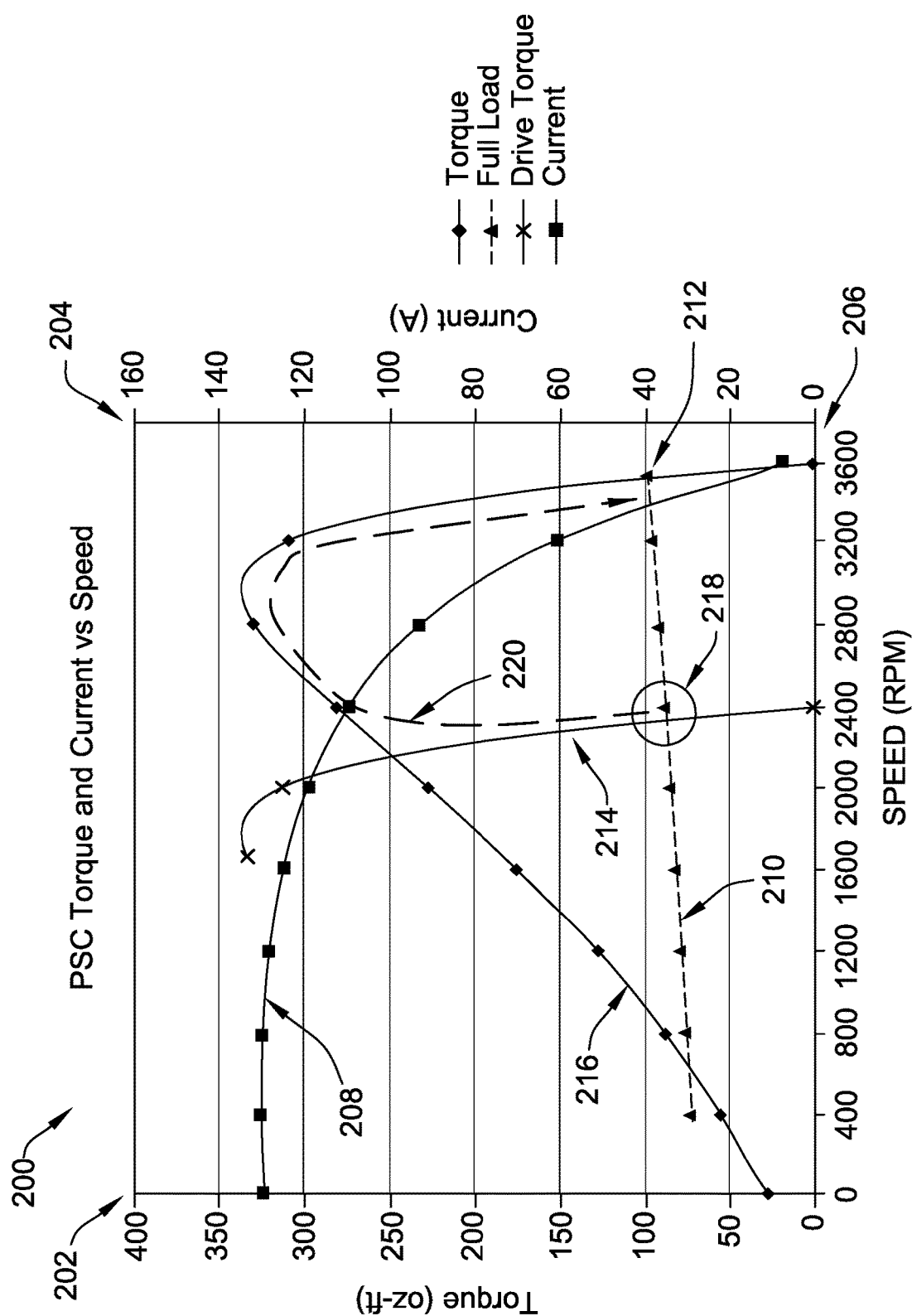
FIG. 2 is a graph of torque, speed, and current for a PSC motor, such as the electric motor shown in FIG. 1.

FIG. 2 is a graph 200 of torque, speed, and current for a PSC motor, such as PSC motor 102, shown in FIG. 1. Graph 200 includes a left vertical axis 202 representing torque in ounce-feet (oz-ft), ranging from zero ounce-feet to 400 ounce-feet. Graph 200 includes a right vertical axis 204 representing current supplied to the PSC motor in Amperes (A), ranging from zero Amperes to 160 Amperes. Graph 200 includes a horizontal axis 206 representing speed of the PSC motor in rotations per minute (RPM), ranging from zero RPM to above 3600 RPM.

Graph 200 includes a current curve 208 that represents the current demanded by the PSC motor versus the motor speed. Current curve 208 is relatively high and flat as the motor starts and builds speed. Demanded current falls as motor speed increases, falling gradually at lower speeds and falling with an increasing negative slope as motor speed increases.

Graph 200 includes a full-load torque curve 210 representing the peak torque demand on the PSC motor versus motor speed when operating the system. Full-load torque curve 210 is based on the PSC operating at full capacity and at line frequency power. Full-load torque curve 210 further defines a peak torque value 212, represented as a triangle on full-load torque curve 210.

Graph 200 includes a torque curve 214 that represents the torque output of the PSC motor while being driven by an inverter in a drive circuit, such as, for example, electric motor system 100 and inverter 116, shown in FIG. 1. Torque curve 214 illustrates operation of the PSC motor at speeds no greater than 2400 RPM, and producing high levels of torque output.

Graph 200 includes a torque curve 216 that represents the torque output of the PSC motor while being driven at line frequency power. Torque curve 216, notably, operates with little torque output when starting from zero RPM. Torque curve 216 and full-load torque curve 210 illustrate, at low speeds, the torque output of the PSC motor is below full-load torque curve 210. As motor speed increases, torque curve 216 is relatively linear until its peak around 3000 RPM, above which torque output declines rapidly.

Intersection 218 further represents the point for PSC motor 102 to transition from being driven by inverter 116 to being driven by line frequency power. Upon supply of line frequency current to start winding 104 and main winding 106, PSC motor 102 accelerates along a transition torque curve 220 until peak torque value 212 is reached on full-load torque curve 210.

Figure 3:
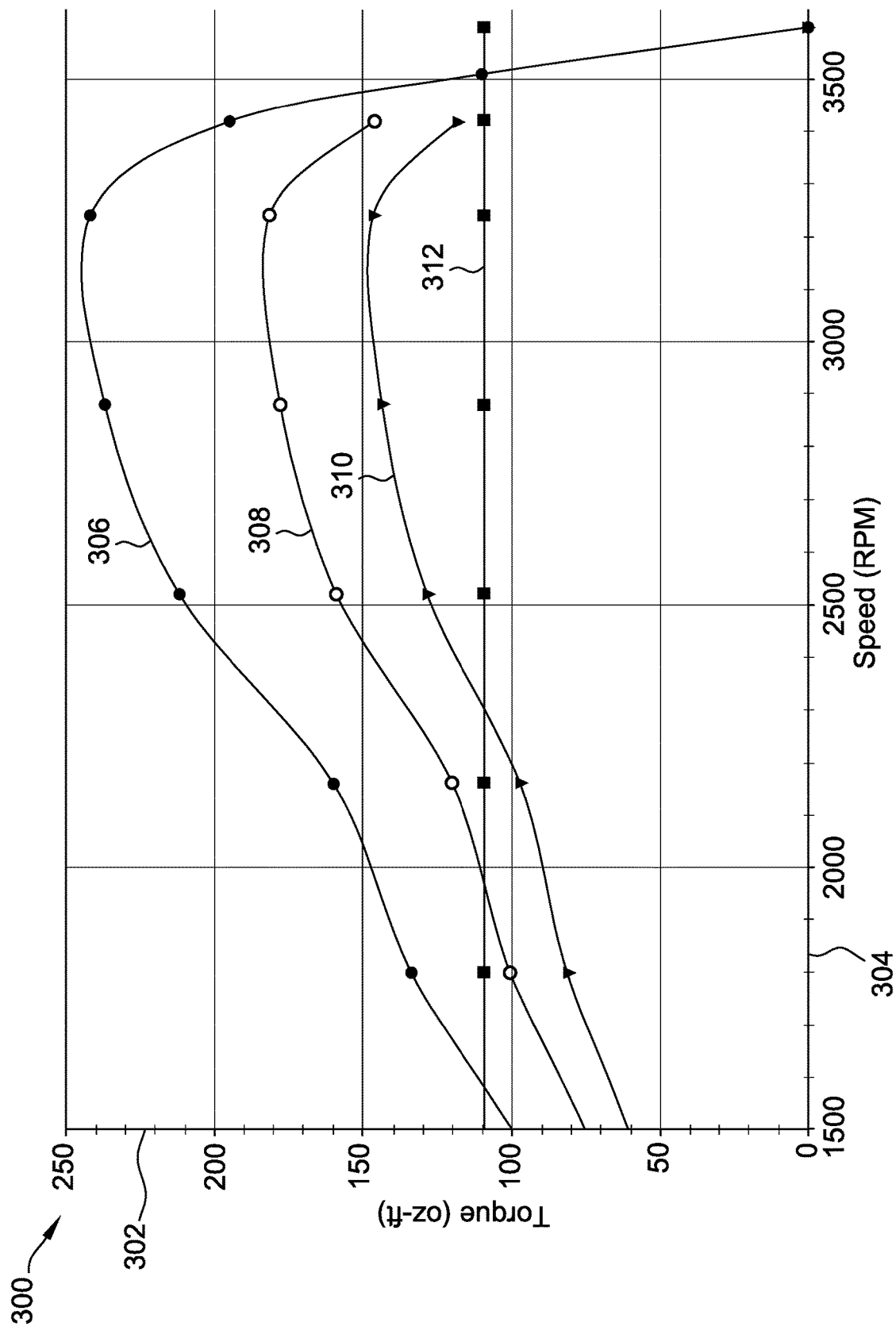
FIG. 3 is a graph of torque and speed for a PSC motor, such as the electric motor shown in FIG. 1.

FIG. 3 is a graph 300 of torque and speed for a PSC motor, such as PSC motor 102, shown in FIG. 1. Graph 300 includes a vertical axis 302 representing torque in ounce-feet (oz-ft), ranging from zero ounce-feet to 250 ounce-feet. Graph 300 includes a horizontal axis 304 representing speed of the PSC motor in rotations per minute (RPM), ranging from 1500 RPM to 3600 RPM.

Graph 300 further includes a first torque curve 306 representing a torque output of PSC motor 102 while being driven by line power at a voltage of 240 volts, a second torque curve 308 representing a torque output of PSC motor 102 while being driven at a voltage of 208 volts, and a third torque curve 310 representing a torque output of PSC motor 102 while being driven at a voltage of 187 volts. Graph 300 further includes a load torque curve 312 representing an example load torque for PSC motor 102.

For PSC motor 102 to effectively rotate its load, the torque produced by PSC motor 102 must be greater that the load torque illustrated by load torque curve 312. At relatively low speeds (e.g., about 1500 RPM), first torque curve 306, second torque curve 308, and third torque curve 310 do not surpass load torque curve 312, indicating that at such speeds, PSC motor 102 cannot effectively transition from inverter supply to line supply, as such a transition would result in a stall event. By contrast, at higher speeds, first torque curve 306, second torque curve 308, and third torque curve 310 do surpass load torque curve 312, enabling PSC motor 102 to effectively transition from inverter supply to line supply. As illustrated by graph 300, depending on the input voltage of inverter 116, a certain threshold speed is necessary to effectively transition from inverter supply to line supply.

As shown in graph 300, when the line voltage is greater (e.g., in the case of first torque curve 306), the torque produced by PSC motor 102 is generally greater at all speeds, while when the line voltage is less (e.g., in the case of third torque curve 310), the torque produced by PSC motor 102 is generally less at all speeds. Because output torque of PSC motor 102 may drop during a transition from supplying power by inverter 116 to supplying line power, it is advantageous for the output torque to exceed the load torque by a relatively large margin. Accordingly, it is advantageous for inverter 116 to have a relatively high speed (e.g. at least 2400 RPM) and/or a relatively greater input voltage (e.g., about 240 volts).

Figure 4:
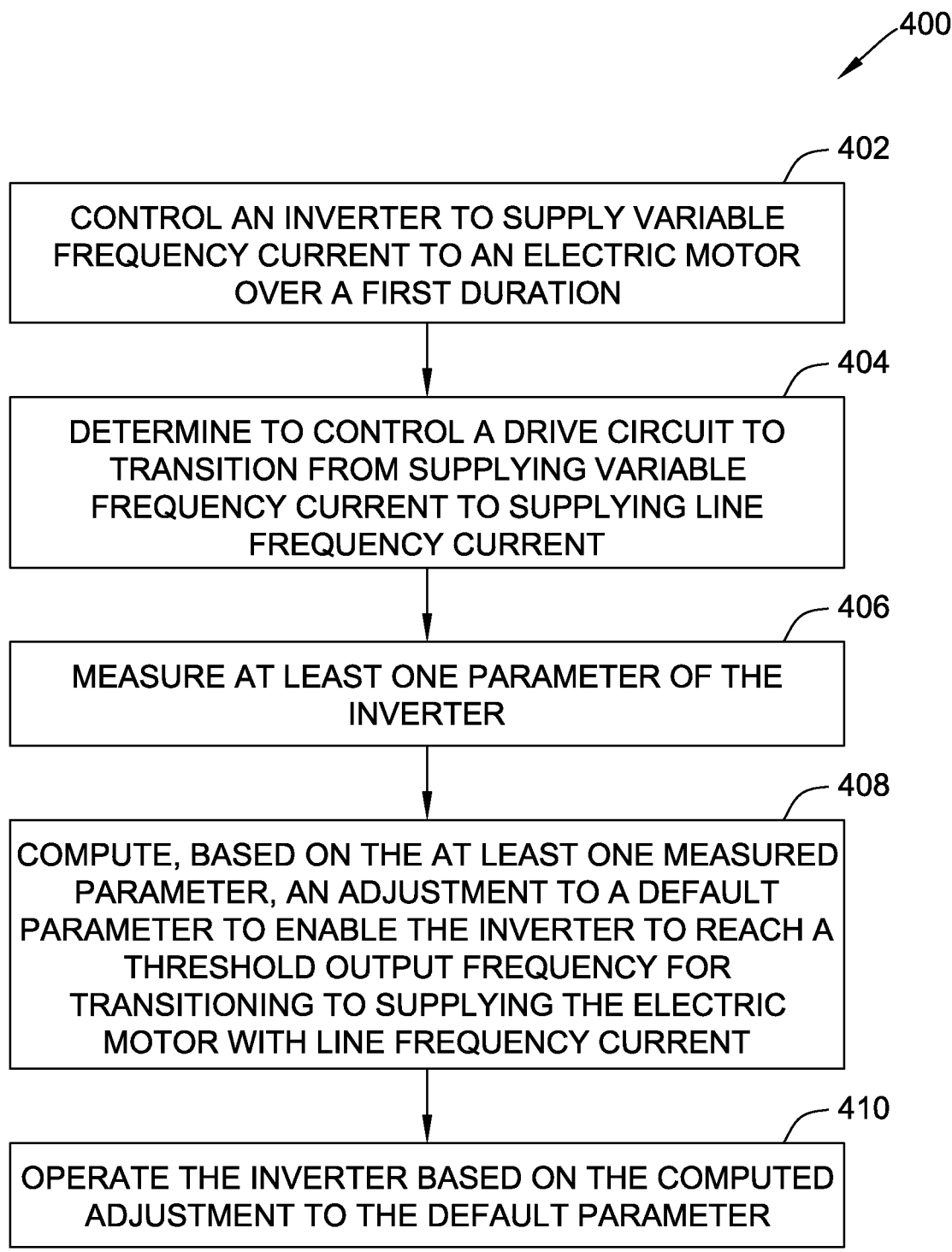
FIG. 4 is a flow diagram of an example method of operating an electric motor in accordance with the present disclosure.

FIG. 4 is a flow diagram of an example method 400 of operating PSC motor 102 (shown in FIG. 1). Motor controller 132 (or system controller 140) controls 402 inverter 116 to supply variable frequency current to PSC motor 102 over a first duration. Motor controller 132 determines 404 to control electric motor system 100 to transition from supplying variable frequency current to supplying line frequency current (e.g., in response to a load demand threshold being exceeded). Motor controller 132 measures 406 at least one parameter of inverter 116. Motor controller 132 computes 408, based on the at least one measured parameter, an adjustment to the default parameter to enable inverter 116 to reach a threshold output frequency for transitioning to supplying PSC motor 102 with line frequency current. Motor controller 132 operates 410 inverter 116 based on the computed adjustment to the default parameter.

In some embodiments, the at least one measured parameter is an input voltage, a current, or a temperature of inverter 116.

In some embodiments, motor controller 132 in response to PSC motor 102 reaching an output frequency greater than the threshold output frequency, disables inverter 116, and, in response to inverter 116 being disabled, supplies line frequency current to PSC motor 102, for example, by closing switch 114.

In some embodiments, the default parameter is a voltage to frequency constant specifying the ratio of output voltage to output frequency for inverter 116, and to adjust the default parameter, motor controller 132 adjusts the voltage to frequency constant.

In some embodiments, the default parameter is a maximum allowed phase current, and to adjust the default parameter, motor controller 132 increases the maximum allowed phase current.

In some embodiments, motor controller 132 computes a maximum output frequency for inverter 116 and determines an amount to adjust the default parameter based on a difference between the threshold output frequency and the computed maximum output frequency.

Some embodiments involve the use of one or more electronic or computing devices (e.g., for controlling operation of a drive circuit and/or individual components thereof). Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the example embodiment, additional output channels may include, but not be limited to, an operator interface monitor.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric motor system comprising:
   a drive circuit comprising an inverter configured to supply variable frequency current over a first duration, and a switch configured to supply line frequency current over a second duration;
   an electric motor coupled to the drive circuit; and
   a controller communicatively coupled to the drive circuit, wherein said controller is configured to:
      control said inverter to supply variable frequency current to said electric motor over the first duration;
      determine to control the drive circuit to transition from supplying variable frequency current to supplying line frequency current;
      measure at least one parameter of said inverter;
      compute a maximum output frequency for said inverter;
      compute, based on the at least one measured parameter and on a difference between a threshold output frequency and the computed maximum output frequency, an adjustment to a default parameter to enable said inverter to reach the threshold output frequency for transitioning to supplying said electric motor with line frequency current; and
      operate said inverter based on the computed adjustment to the default parameter.

2. The electric motor system of claim 1, wherein the at least one measured parameter is an input voltage, a current, or a temperature of said inverter.

3. The electric motor system of claim 1, wherein said controller is further configured to:
   in response to said electric motor reaching an output frequency greater than the threshold output frequency, disable said inverter; and
   in response to said inverter being disabled, supply line frequency current to said electric motor.

4. The electric motor system of claim 1, wherein the default parameter is a voltage to frequency constant specifying the ratio of output voltage to output frequency for said inverter, and wherein to adjust the default parameter, said controller is further configured to adjust the voltage to frequency constant.

5. The electric motor system of claim 1, wherein the default parameter is a maximum allowed phase current, and wherein to adjust the default parameter, said controller is configured to increase the maximum allowed phase current.

6. The electric motor system of claim 1, wherein said electric motor is a permanent-split capacitor (PSC) motor comprising a start winding and a main winding, said start winding and said main winding configured to receive current from said drive circuit.

7. A method for controlling a drive circuit for an electric motor, said method comprising:
controlling an inverter of the drive circuit to supply variable frequency current to the electric motor over a first duration;
determining to control the drive circuit to transition from supplying variable frequency current to supplying line frequency current to the electric motor;
measuring at least one parameter of the inverter;
computing a maximum output frequency for the inverter;
computing, based on the at least one measured parameter and on a difference between a threshold output frequency and the computed maximum output frequency, an adjustment to a default parameter to enable the inverter to reach the threshold output frequency for transitioning to supplying the electric motor with line frequency current; and
operating the inverter based on the computed adjustment to the default parameter.

8. The method of claim 7, wherein the at least one measured parameter is an input voltage, a current, or a temperature of the inverter.

9. The method of claim 7, further comprising:
in response to the electric motor reaching an output frequency greater than the threshold output frequency, disabling the inverter; and
in response to the inverter being disabled, supplying line frequency current to the electric motor.

10. The method of claim 7, wherein the default parameter is a voltage to frequency constant specifying the ratio of output voltage to output frequency for the inverter, and wherein to adjust the default parameter, said method further comprising adjusting the voltage to frequency constant.

11. The method of claim 7, wherein the default parameter is a maximum allowed phase current, and wherein said method further comprises increasing the maximum allowed phase current to adjust the default parameter.

12. A motor controller comprising a processor communicatively coupled to a drive circuit of an electric motor, said processor configured to:
control an inverter of the drive circuit to supply variable frequency current to the electric motor over a first duration;
determine to control the drive circuit to transition from supplying variable frequency current to supplying line frequency current to the electric motor;
measure at least one parameter of the inverter;
compute a maximum output frequency for the inverter;
compute, based on the at least one measured parameter and on a difference between a threshold output frequency and the computed maximum output frequency, an adjustment to the default parameter to enable the inverter to reach a threshold output frequency for transitioning to supplying the electric motor with line frequency current; and
operate the inverter based on the computed adjustment to the default parameter.

13. The motor controller of claim 12, wherein the at least one measured parameter is an input voltage, a current, or a temperature of the inverter.

14. The motor controller of claim 12, wherein said processor is further configured to:
in response to the electric motor reaching an output frequency greater than the threshold output frequency, disable the inverter; and
in response to the inverter being disabled, supply line frequency current to the electric motor.

15. The motor controller of claim 12, wherein the default parameter is a voltage to frequency constant specifying the ratio of output voltage to output frequency for the inverter, and wherein to adjust the default parameter, said processor is further configured to adjust the voltage to frequency constant.

16. The motor controller of claim 12, wherein the default parameter is a maximum allowed phase current, and wherein to adjust the default parameter, said processor is configured to increase the maximum allowed phase current.

17. The motor controller of claim 12, wherein the electric motor is a permanent-split capacitor (PSC) motor including a start winding and a main winding, and wherein the processor is configured to control the drive circuit to supply current to the start winding and the main winding.

* * * * *